(12) United States Patent
Larue (10) Patent No.: US 11,497,174 B2
(45) Date of Patent: Nov. 15, 2022

(54) SUPPORTS FOR CENTRIFUGING PLANTS AND METHODS OF SUPPORTING PLANTS DURING CENTRIFUGATION

(71) Applicant: Monsanto Technology LLC, St. Louis, MO (US)

(72) Inventor: Huachun Larue, St. Louis, MO (US)

(73) Assignee: Monsanto Technology LLC, St. Louis, MO (US)

( * ) Notice: Subject to any disclaimer, the term of this patent is extended or adjusted under 35 U.S.C. 154(b) by 76 days.

(21) Appl. No.: 17/212,868

(22) Filed: Mar. 25, 2021

(65) Prior Publication Data

US 2021/0204487 A1 Jul. 8, 2021

Related U.S. Application Data (62) Division of application No. 15/772,773, filed as application No. PCT/US2016/058636 on Oct. 25, 2016, now abandoned.

(60) Provisional application No. 62/250,030, filed on Nov. 3, 2015.

(51) Int. Cl.
*A01G 7/06* (2006.01)

(52) U.S. Cl.
CPC .................................... *A01G 7/06* (2013.01)

(58) Field of Classification Search
CPC .... A01G 7/06; B04B 5/00; B04B 5/02; B04B 7/08
See application file for complete search history.

(56) References Cited

U.S. PATENT DOCUMENTS

| | | | |
|---|---|---|---|
| 637,763 | A | 11/1899 | Burke |
| 1,031,713 | A | 7/1912 | Hills |
| 2,745,217 | A | 5/1956 | Richard et al. |
| 3,065,570 | A | 11/1962 | Fukuhara |
| 3,195,272 | A | 7/1965 | Mosher |
| 3,991,516 | A | 11/1976 | Cicero |

(Continued)

FOREIGN PATENT DOCUMENTS

WO 2015/168659 A1 11/2015

OTHER PUBLICATIONS

International Search Report and Written Opinion for PCT/US2016/058636 dated Apr. 4, 2017.

*Primary Examiner* — Michael H Wang
(74) *Attorney, Agent, or Firm* — McBee Moore & Vanik IP, LLC; Susan McBee (57) ABSTRACT

A plant support for centrifuging plants comprises at least first and second portions that are configurable in a closed configuration that defines an internal cavity adapted to radially support plants in a manner at least partially preventing the plants from deforming or changing orientation during centrifugation. The first and second portions are also configurable in an open configuration that allows the plants to be inserted between the at least first and second portions into what becomes the internal cavity from the side rather than axially. Another plant support comprises a plurality of plant support rods that are removably attached to a platform that holds the plant support rods perpendicular to the platform and parallel to each other during centrifugation. A method involves supporting a plant radially relative to the g-loading during centrifugation such that a treatment agent remains in contact with only a portion of the plant.

6 Claims, 10 Drawing Sheets

(56) References Cited

U.S. PATENT DOCUMENTS

| | | | |
|---|---|---|---|
| 4,023,305 A | | 5/1977 | Harschel |
| 4,216,622 A | | 8/1980 | Hollenbach et al. |
| 4,582,606 A | * | 4/1986 | McCarty ............... B04B 5/0428 494/21 |
| 4,945,050 A | | 7/1990 | Sanford et al. |
| 5,157,869 A | | 10/1992 | Minton |
| 5,359,809 A | | 11/1994 | Johnson |
| 6,085,459 A | | 7/2000 | Conner |
| 7,261,860 B1 | * | 8/2007 | Vellinger ................. B04B 5/02 422/50 |
| 9,265,367 B2 | | 2/2016 | Arnott |
| 9,668,428 B1 | | 6/2017 | Frame |
| 10,750,670 B2 | | 8/2020 | Logan |
| 2006/0144803 A1 | | 7/2006 | Eberle |
| 2007/0227068 A1 | | 10/2007 | Cataldi |
| 2008/0028678 A1 | | 2/2008 | Banhagel |
| 2008/0078118 A1 | | 4/2008 | Bissonnette et al. |
| 2014/0196365 A1 | | 7/2014 | Washington |
| 2017/0172071 A1 | | 6/2017 | Shaffer et al. |
| 2017/0354097 A1 | | 12/2017 | Hadley |
| 2019/0364745 A1 | | 12/2019 | Soutullo |
| 2021/0059138 A1 | * | 3/2021 | Muir ....................... A01G 7/06 |
| 2022/0174884 A1 | * | 6/2022 | Steuperaert .............. A01G 7/06 |
| 2022/0212206 A1 | * | 7/2022 | Madsen ................... B04B 1/20 |

* cited by examiner

SUPPORTS FOR CENTRIFUGING PLANTS AND METHODS OF SUPPORTING PLANTS DURING CENTRIFUGATION

CROSS-REFERENCE TO RELATED APPLICATIONS

This application is a Divisional of U.S. Ser. No. 15/772,773, filed May 1, 2018, and incorporated herein by reference in its entirety, which is a 35 U.S.C. § 371 National Phase of International Patent Application No. PCT/US2016/058636, filed Oct. 25, 2016, and incorporated herein by reference in its entirety, which claims the benefit of U.S. Provisional Application Ser. No. 62/250,030 filed on Nov. 3, 2015, which is incorporated herein by reference in its entirety.

STATEMENT REGARDING FEDERALLY SPONSORED RESEARCH OR DEVELOPMENT

Not Applicable.

APPENDIX

Not Applicable.

BACKGROUND OF THE INVENTION

Field of the Invention

The present invention pertains to centrifuging plants for the purpose of facilitating the transfer of plant treatment agents into plant tissue. More specifically, the present invention pertains to apparatuses and methods for supporting plants during centrifugation in a manner such that the plants are maintained in desired orientations relative to g-loads, and thereby also to liquid treatment agents, during centrifuging.

General Background

PCT Application No. US2015/028955 and U.S. Provisional Application Ser. No. 61/987,260 (which are hereby incorporated herein by reference in their entireties) disclose methods and apparatuses for facilitating the transfer of plant treatment agents into plant tissue by centrifuging such plant tissue and treatment agents together. Said applications also disclose methods and apparatus for supporting plants during centrifuging such that the plants maintain desired orientations relative to g-loading during the centrifuging process such that target plant tissue remains submerged in the treatment agent while other plant tissue remains unsubmerged.

SUMMARY OF THE INVENTION

The present invention pertains to plant supports for centrifuging plants and methods of supporting plants during centrifugation.

In one aspect of the invention, a plant support for centrifuging plants is configured and adapted to be at least partially positioned within a cup having an open top. The plant support has a primary axis configured to be aligned perpendicular to the top of the cup when the plant support is positioned within the cup. The plant support comprises at least first and second portions that are configurable in a closed configuration relative to each other in a manner defining an internal cavity. The internal cavity has a shape configured and adapted to radially support plants therein relative to the primary axis in a manner at least partially preventing the plants from deforming or changing orientation during centrifugation. The at least first and second portions of the plant support are also configurable in an open configuration relative to each other when the plant support is outside of the cup. In the open configuration, plants can be inserted between the at least first and second portions into what becomes the internal cavity from a direction radial to the primary axis, thereby reducing the likelihood of damaging the plants as a result of inserting and removing the plants from the internal cavity.

In another aspect of the invention a plant support for centrifuging plants comprises a platform and a plurality of elongate plant support rods. The platform is configured and adapted to support the plurality of elongate plant support rods in a vertical orientation relative to the platform. The elongate plant support rods are selectively removable from the platform by vertically lifting the plant support rods from the platform. The plant support also comprises a plurality of seed support protrusions that are each fixed to a respective one of the plant support rods and that each protrude radially outward from a side of the respective one of the plant support rods. The seed support protrusions remain fixed to the plant support rods when the plant support rods are removed from the platform.

In yet another aspect of the invention, a method of preparing at least one plant for centrifuging comprises placing the plant at least partially into a plant support. The plant support comprises at least first and second portions that are positionable in a closed configuration and an open configuration. The at least first and second portions define an internal cavity that is configured and adapted to radially support the plant relative to a primary axis when the at least first and second portions are positioned in the closed configuration. The placing of the plant into the plant support occurs radially relative to the primary axis while the at least first and second portions are in the open configuration. The method further comprises moving the at least first and second portions from the open configuration to the closed configuration in a manner such that the plant becomes radially supported within the internal cavity of the plant support relative to the primary axis. Still further, the method comprises placing the plant support in a cup having an open top. The placing of the plant support in the cup occurs while the at least first and second portions are in the closed configuration and while the plant is radially supported within the internal cavity of the plant support and with the primary axis oriented perpendicular to the top of the cup. The cup prevents the at least first and second portions from being positioned in the open configuration while the plant support is in the cup.

Still another aspect of the invention pertains to a method of centrifuging at least one plant. The method comprises securing the plant(s) to one or more elongate plant support rods and thereafter attaching the plant support rods to a platform in a manner such that the platform holds the plant support rods perpendicular to the platform and parallel to each other. The method also comprises placing the platform with the plant support rods attached thereto into a cup and thereafter centrifuging the cup with the platform and plant support rods in the cup and in a manner such that g-loading acts parallel to the plant support rods.

Another aspect of the invention pertains to a method of infusing plant tissue with a liquid treatment agent. The method comprises centrifuging a plant in a receptacle of a swing-bucket centrifuge. The plant is secured within the receptacle of the swing-bucket centrifuge such that the plant is held in a particular orientation relative to g-loading acting on the plant as a result of the centrifuging. The receptacle comprises an amount of the liquid treatment agent that is sufficient to submerge a portion of the plant therein while leaving a remaining portion of the plant unsubmerged during the centrifuging.

Further features and advantages of the present invention, as well as the operation of the invention, are described in detail below with reference to the accompanying drawings.

Reference numerals in the written specification and in the drawing figures indicate corresponding items.

DETAILED DESCRIPTION

Figure 1:
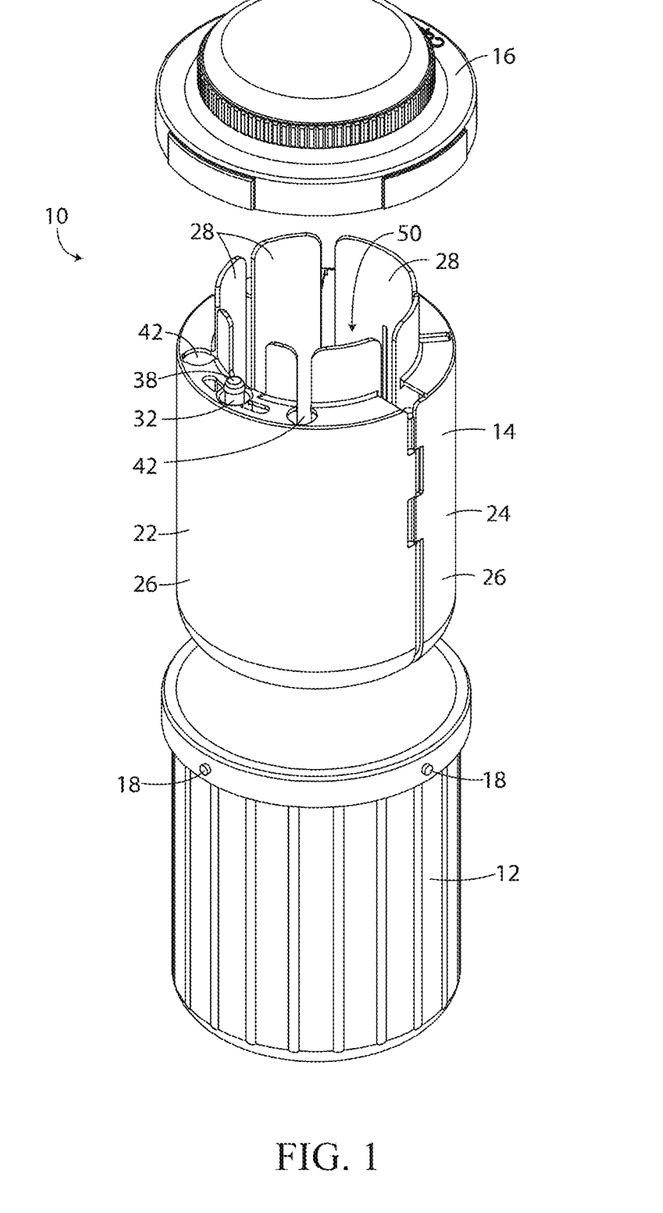
FIG. 1 depicts an exploded assembly view of a canister for centrifuging plants.

An exploded assembly view of a canister (10) for centrifuging plants is shown in FIG. 1. The canister (10) comprises a cup (12) a plant support (14) and a cap (16). The cup (12) is cylindrical and has an open top that has an external male bayonet fitting (18). The plant support (14) is configured to slip into and out of the cup (12) when the cap (16) is detached from the cup (12). The cap (16) comprises an internal female bayonet fitting (20) and is releaseably attachable to the cup (12) via the bayonet fittings (18, 20). The cup (12) and the cap (16) are dimensioned to surround and contain the plant support (14). The cup (12) is also configured to be placed into a swing bucket centrifuge rotor, e.g. a Beckman Colter SX4750A.

Figure 2:
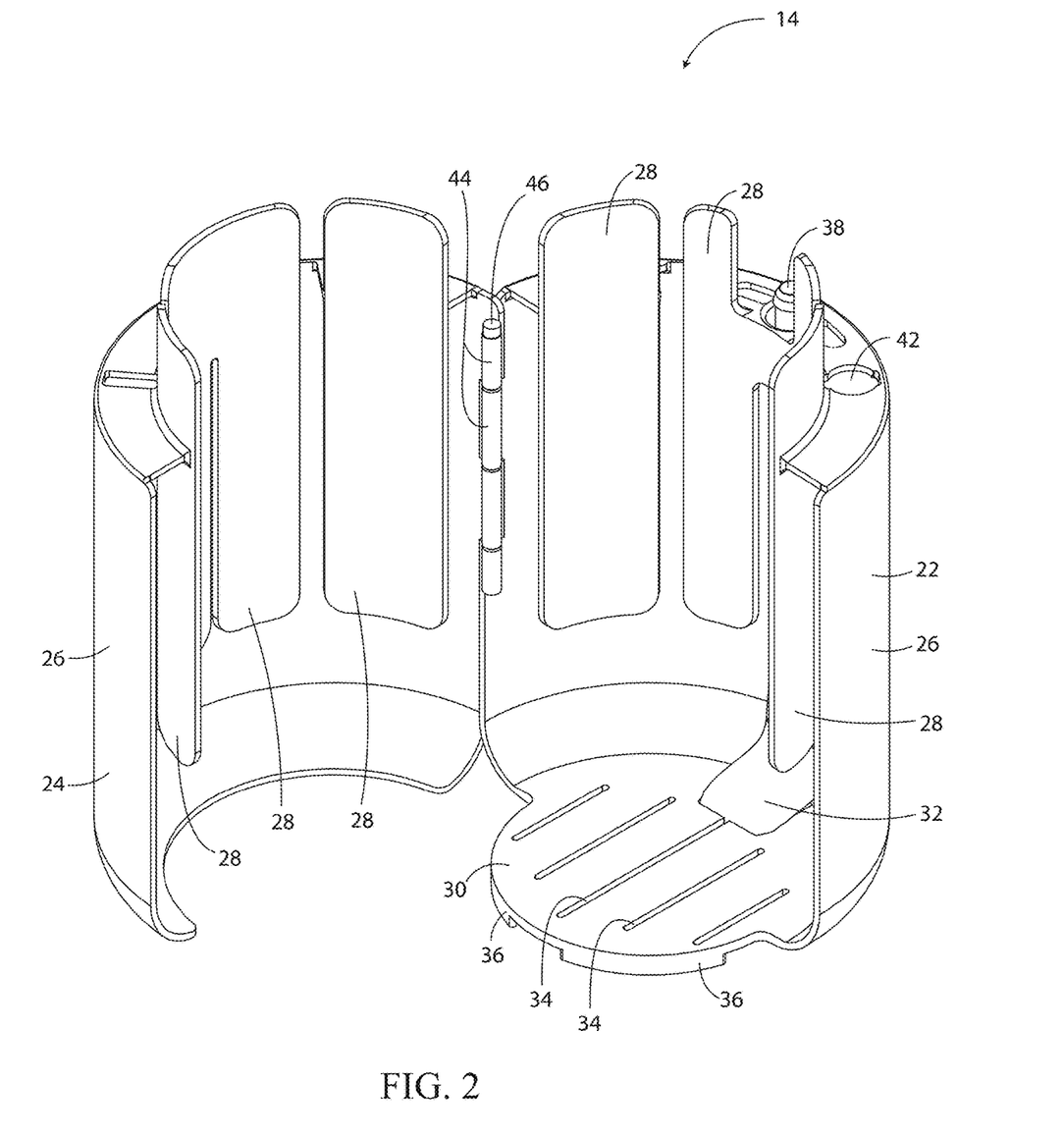
FIG. 2 depicts a perspective view of the plant support of the assembly shown in FIG. 1, with the plant support in its open configuration.
Figure 3:
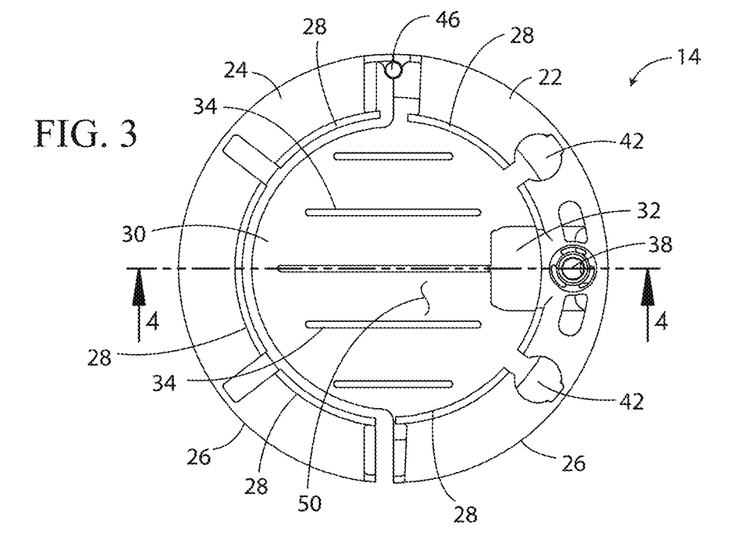
FIG. 3 depicts a top view of the plant support shown in FIG. 2, with the plant support in its closed configuration.
Figure 4:
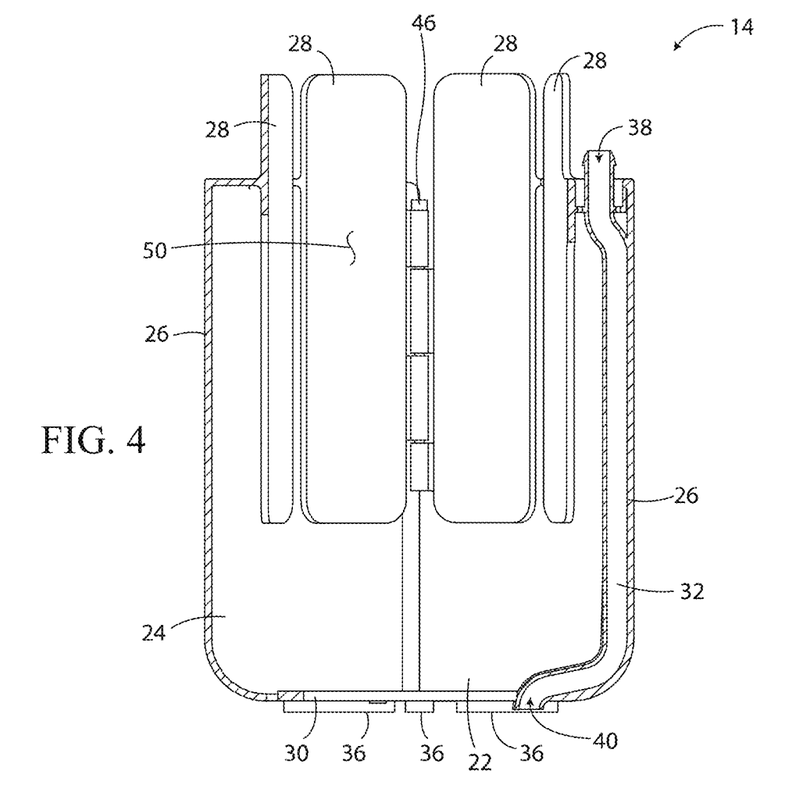
FIG. 4 depicts a cross-sectional view of the plant support shown in FIGS. 2 and 3, with the plant support in its closed configuration and taken about the line 4-4 shown in FIG. 3.

The plant support (14) comprises a primary body portion (22) and a secondary body portion (24) that are hinged to each other such that the plant support can be adjusted between open and closed configurations. FIG. 1 shows the plant support (14) in its closed configuration. FIG. 2 shows the plant support (14) in its open configuration. Each of the body portions (22, 24) comprises an outer semi-cylindrical wall (26) and resiliently deformable inner plant engagement members (28). The outer walls (26) of the body portions (22, 24) preferably each form half of a cylinder, but either could form more or less of a cylinder (of course they could have other shapes). The plant engagement members (28) are preferably connected to the top of the respective outer wall (26) and the lower ends of the plant engagement members are configured to resiliently deflect radially outward toward the outer wall. To facilitate that deflection, the plant engagement members (28) are relatively thin and cantilever in an elongate manner from the outer wall (26). The primary body portion (22) also comprises a base wall (30) and a fluid drainage/fill tube (32). The base wall (30) is configured to close off the base of the plant support (14) when the plant support is in its closed configuration, and has a plurality of drain holes (34). Spacers (36) extend downward from the base wall (30) and are configured to vertically offset the base wall from the bottom of the cup (12) when the plant support (14) is placed in the cup. The fluid drainage tube (34) has a top opening (38) accessible from above the plant support (14) and extends down therefrom and ultimately through the base wall (30) to its downward facing bottom opening (40). As the fluid drainage tube (34) extends downward, it extends radially between the outer wall (26) of the primary body portion (22) and the plant engagement members (28). As is shown most clearly in FIG. 4, the bottom opening (40) of the fluid drainage tube (34) is positioned beneath the base wall (30), but slightly above the bottom of the spacers (36). The primary body portion (22) further comprises fluid inlet openings (42) that extend through the portion of the primary body portion that connects the plant engagement members (28) to the outer wall (26). The hinge that connects the primary body portion (22) to the secondary body portion (24) is preferably formed by intermeshing hinge knuckles (44) provided on both the primary and secondary body portions that are interlocked to each other via a hinge pin (46).

Figure 13:
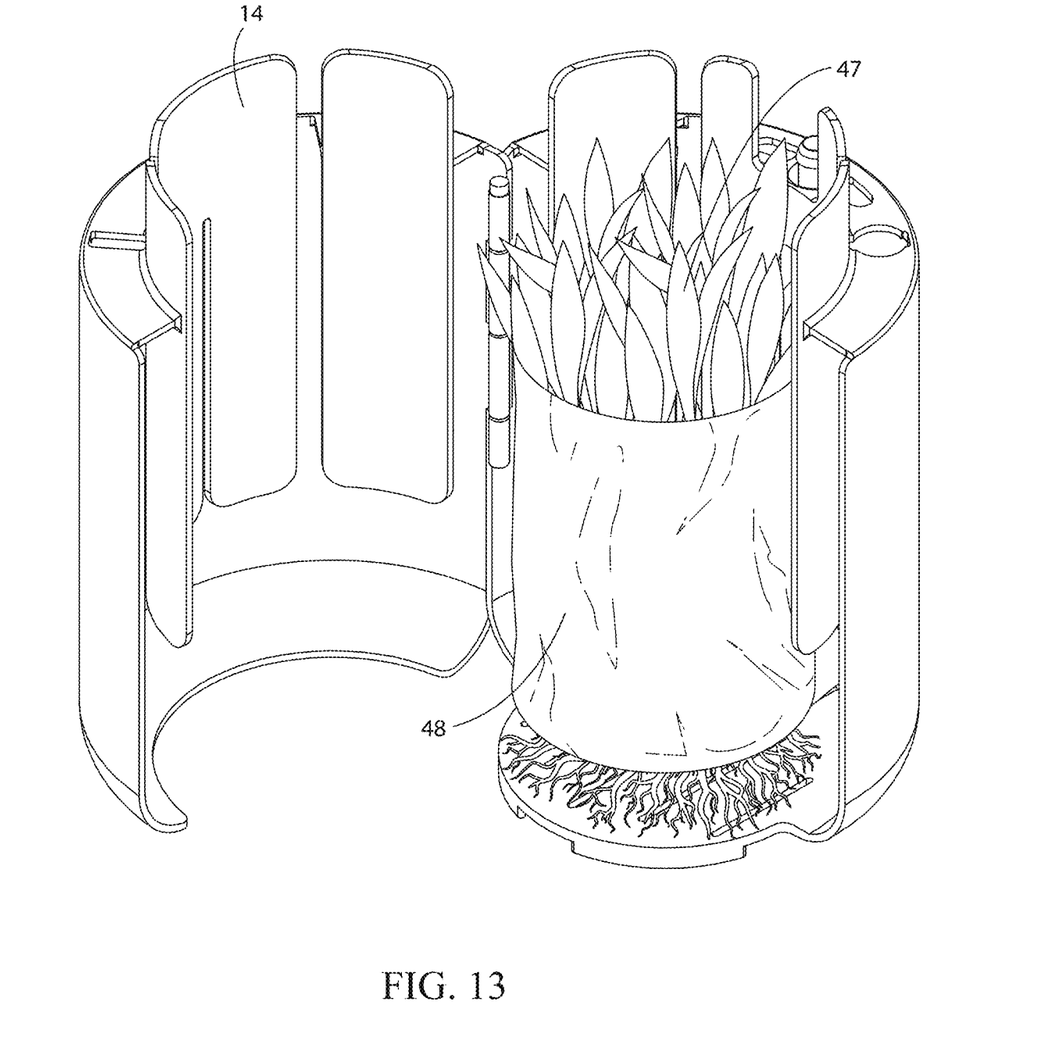
FIG. 13 depicts a perspective view similar to FIG. 2, but with a bundle of plants loaded into the plant support.
Figure 14:
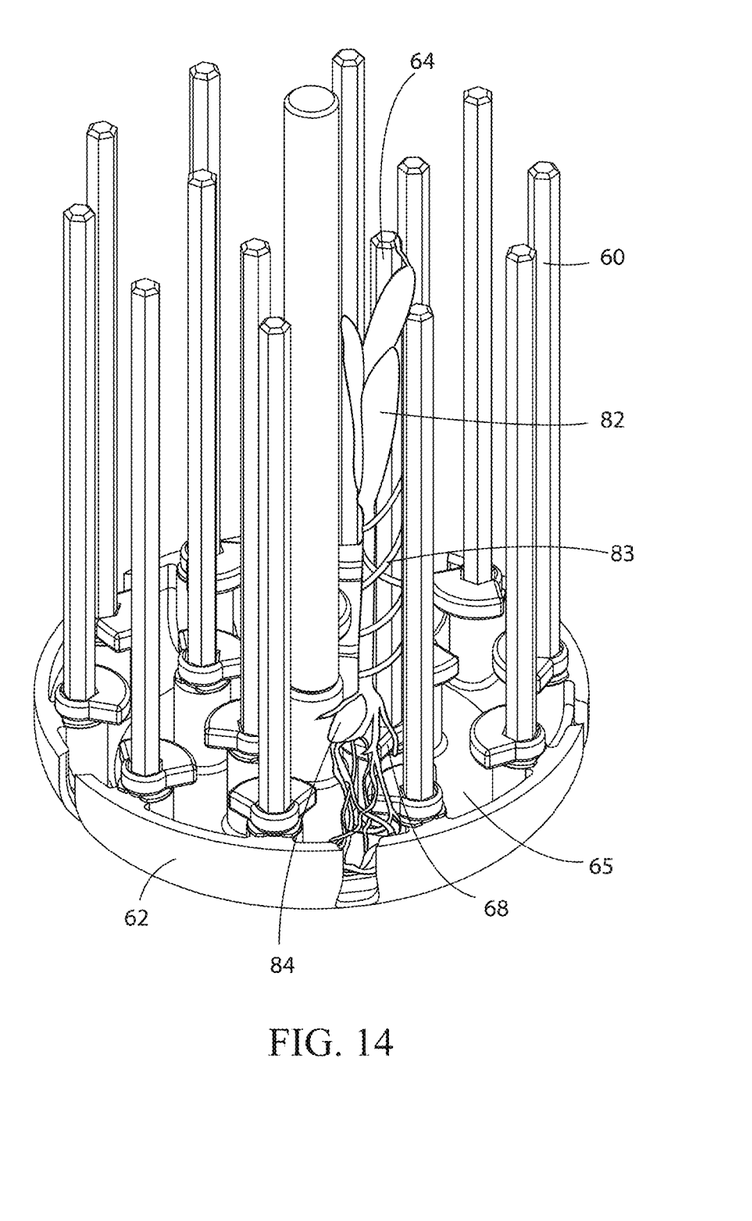
FIG. 14 depicts a perspective view similar to FIG. 7, but with a plant attached to one of the plant support rods of the plant support of the assembly.

In use and as shown in FIG. 13, one or more plants (47) can be loaded radially into the plant support 14 while the primary and secondary body portions (22, 24) are swung open about the hinge pin (46) relative to each other. Preferably the plants (47) are placed first against the primary body portion (22) with their roots above the base wall (30) of the primary body portion. The plant(s) (47) can first be wrapped in a pliable material (48), such as metal foil. The pliable material (48) can help hold the plant(s) (47) in a desired orientation and generally cylindrical shape. In some cases, the root ball(s) of the plant(s) (47) may be larger in diameter than the stems of the plants. The plant engagement members (28) accommodate this by terminating appreciably above the base wall (30) of the plant support (14). Furthermore, because the plant engagement members (28) are attached to the outer walls (26) of the primary and secondary body portions (22, 24) of the plant support only near the top of the plant support, the plant engagement members (28) can resiliently deflect radially outward at their bottom ends to snugly accommodate such plant(s) (47). Once the plant(s)

(47) are loaded onto the primary body portion (22) of the plant support (14), the secondary body portion (24) of the plant support can be swung closed relative to the primary body portion, thereby securing the plant(s) within the internal cavity (50) formed by the primary and secondary body portions (22, 24). It should be appreciated that, when closed, the primary and secondary body portions (22, 24) of the plant support (14) radially support the plant(s) and thereby support the plant(s) in a desired orientation for centrifuging (as used herein radially support means support that resists movement toward or away from the central or primary axis of the plant support or cup).

Figure 5:
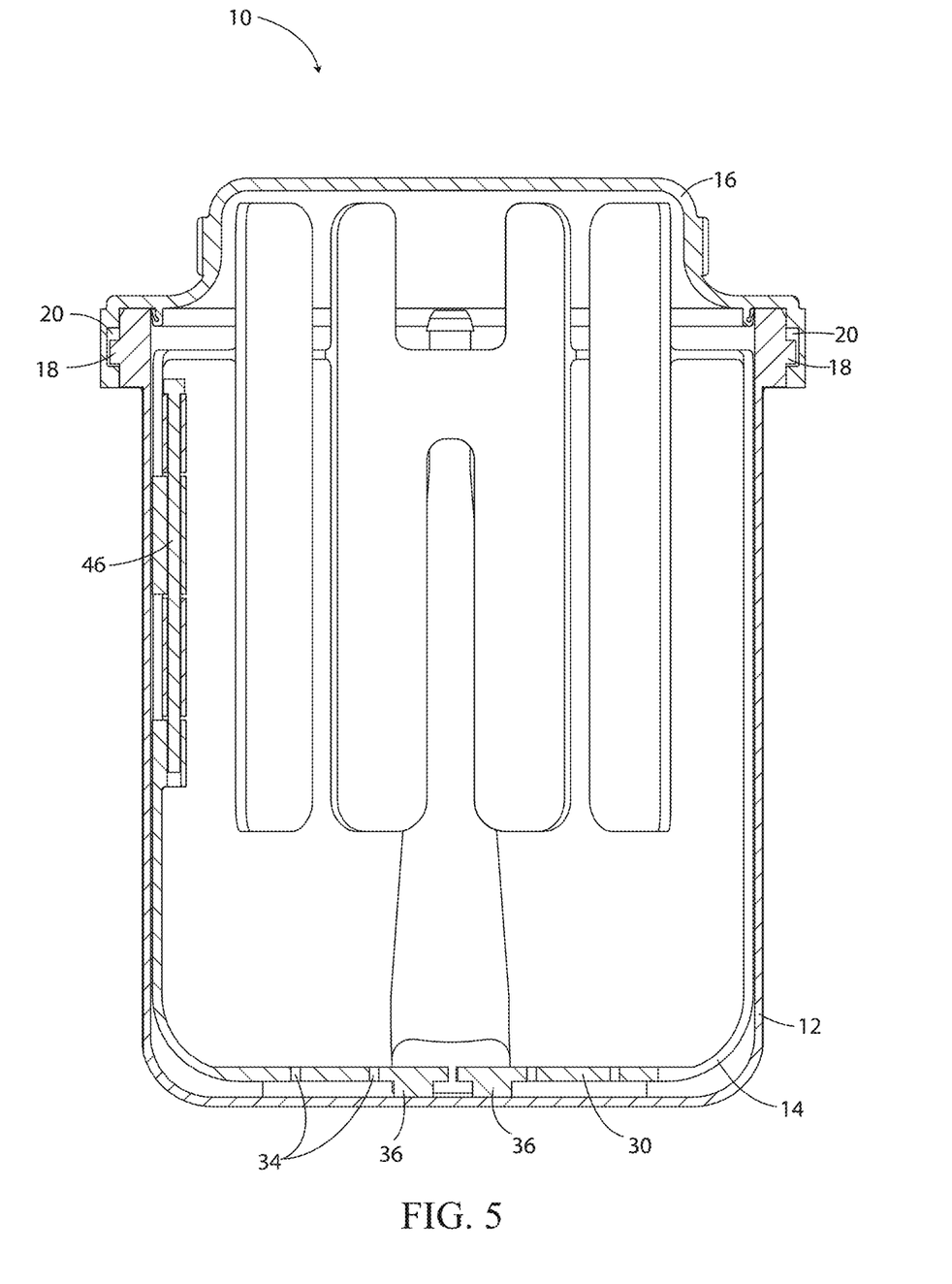
FIG. 5 depicts a cross-sectional view of the canister shown in FIG. 1, fully assembled and taken about a plane parallel that includes the primary axis of the canister and is perpendicular to the plane that intersects both the primary axis and the axis of the hinge of the plant support.
Figure 6:
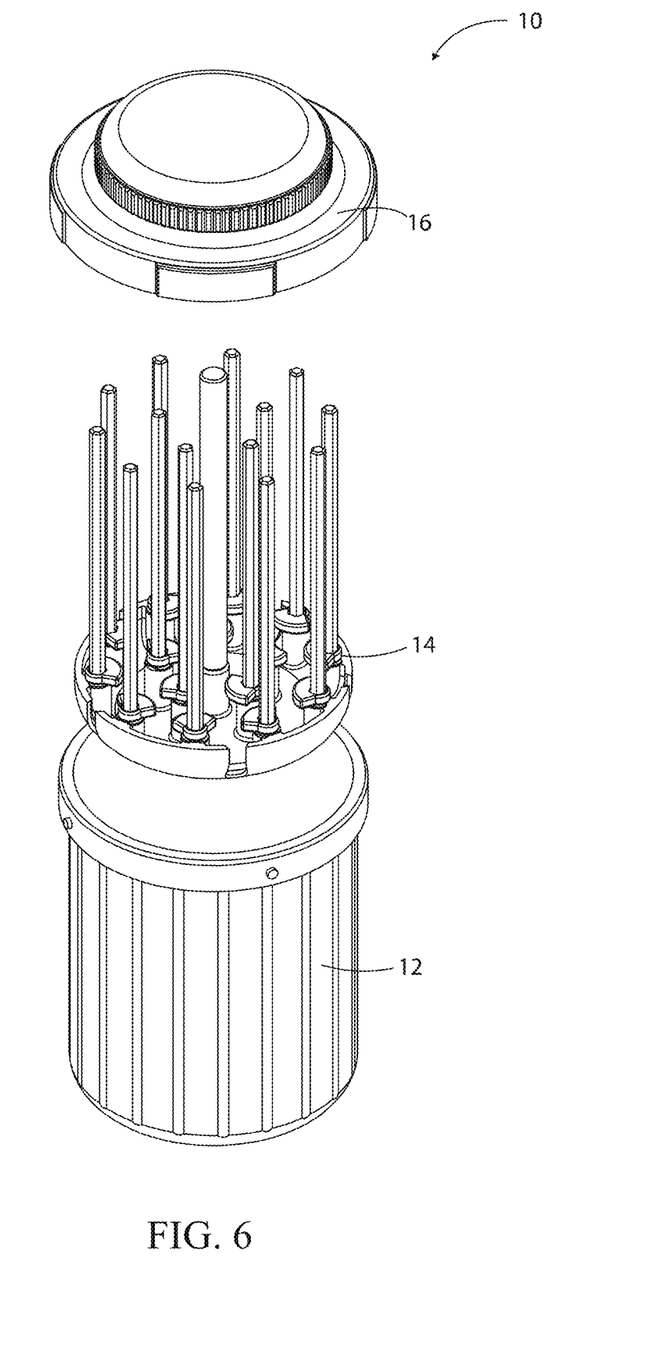
FIG. 6 depicts an exploded assembly view of another canister for centrifuging plants.
Figure 7:
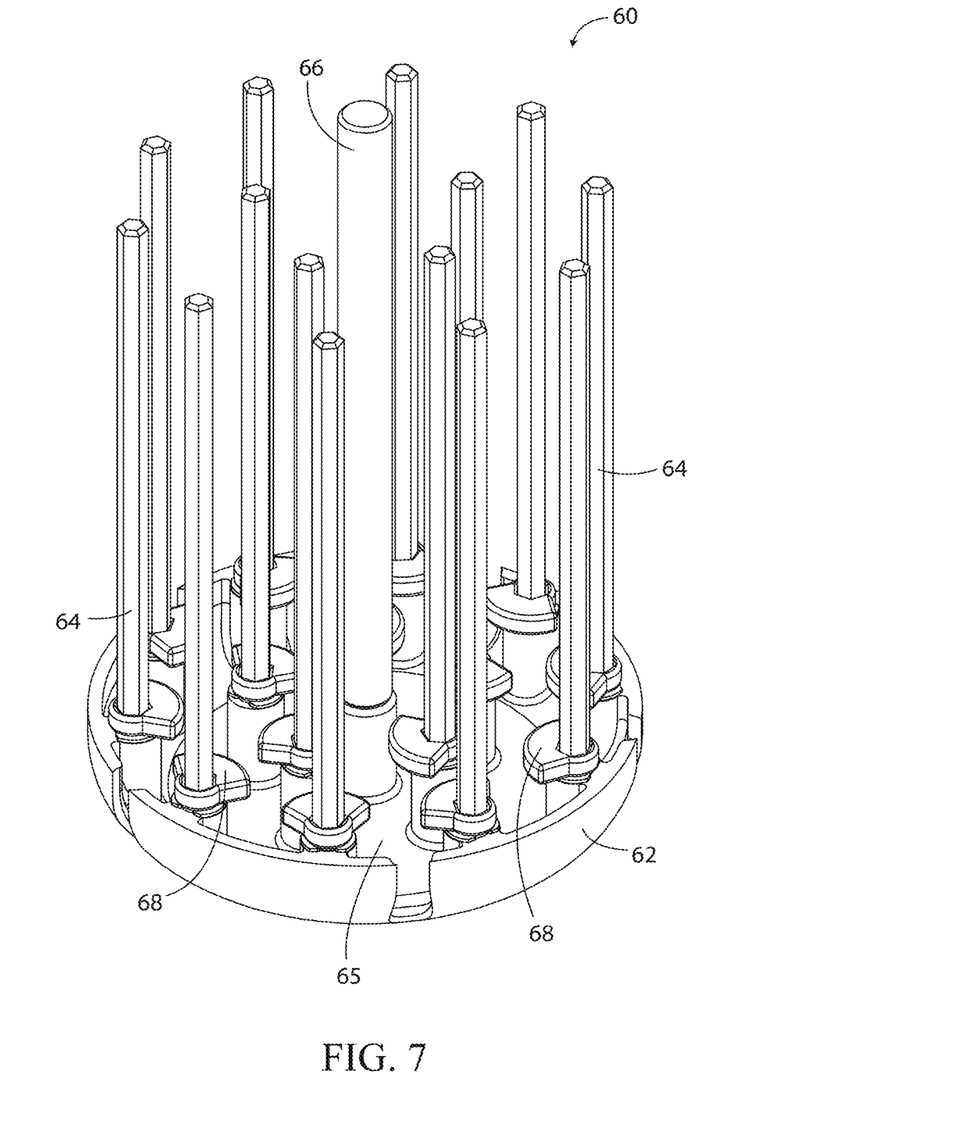
FIG. 7 depicts a perspective view of the plant support of the assembly shown in FIG. 6.
Figure 8:
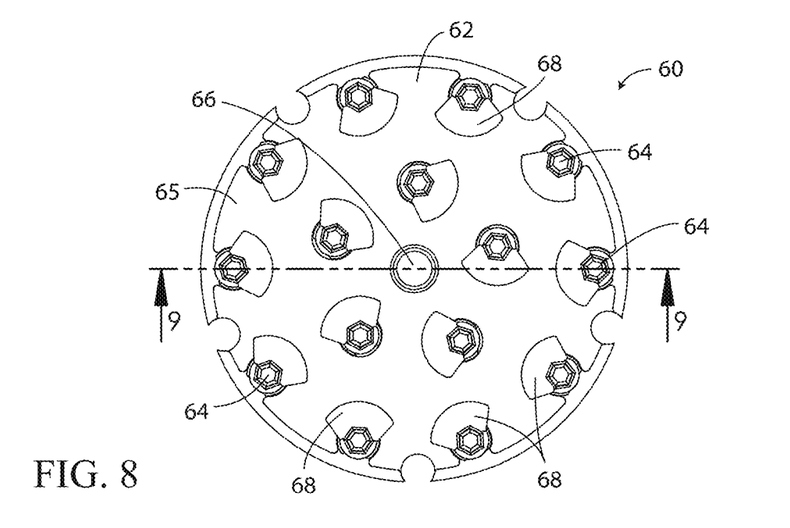
FIG. 8 depicts a top view of the plant support shown in FIG. 7.
Figure 9:
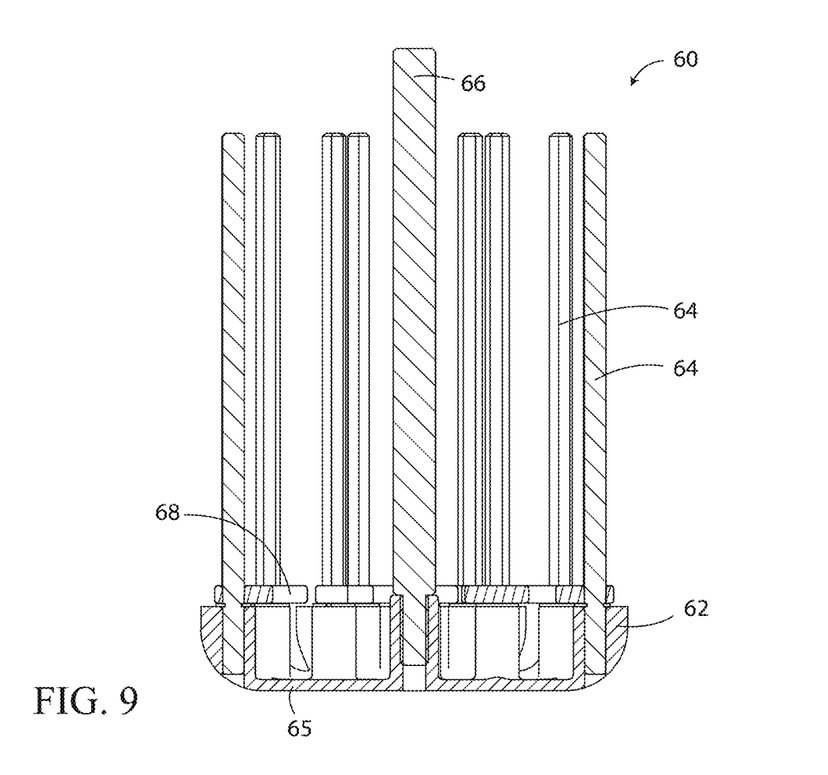
FIG. 9 depicts a cross-sectional view of the plant support shown in FIGS. 7 and 8, taken about the line 9-9 shown in FIG. 8.

With the plant(s) (47) positioned in the internal cavity (50) of the plant support (14) and the primary and secondary body portions (22, 24) in their closed configuration relative to each other, the plant support can be slid down into the cup (12) of the canister (10). When the plant support (14) is positioned in the cup (12), the spacers (36) that extend down from the base wall (30) of the plant support offset the base wall of the plant support slightly above the bottom surface of the cup, thereby forming a space between the base wall of the plant support and the bottom surface of the cup. This is shown most clearly in FIG. 5. Plant treatment agents can then poured into the cup (12) via the fluid inlet openings (42) provided in the plant support (14). Using the fluid inlet openings (42) to add the liquid treatment agents allows the treatment agents to reach the bottom of the cup (12) without having to drain down over the leaves and stems of the plants. Thus, the agents can submerge lower portions of the plants without wetting other portions of the plants. After a desired amount of treatment agent has been added to the cup (12), the cap (16) is thereafter locked onto the cup via the bayonet fittings (18, 20) of the cup and cap and the complete canister assembly (10) can be placed into a receptacle of a swing bucket of a centrifuge and thereafter centrifuged. The cap (16) serves primarily to prevent spillage of the treatment agents, but can also prevent evaporation of such agents. It should be appreciated that during the centrifuging process the swing bucket will swing outward from the center of rotation in a manner such that the primary axes of the plant support (14) and of the cup (12) will tilt in a manner such that the axes remain generally parallel to the g-load acting on the cup and plant support. Thus, since the plants 47 are radially supported by the plant support (14), the plant also maintains a relatively constant orientation relative to g-loads experienced, as does the liquid treatment agent relative to the plant. This keeps the treatment agent in contact with the desired portion of the plant and away from the other portions of the plant. Following the centrifuging, the treatment agent can be drained from the cup (12) by applying a vacuum to the top opening (38) of the fluid drainage tube (32). This draws the treatment agent out of the cup (12) from beneath the base wall (30) of the plant support (14) via the bottom opening (40) of the fluid drainage tube (32). The drain holes (34) in the base wall (30) of the plant support (14) allow the treatment agent to pass down through the base wall during this process. Thus, substantially all of the treatment agent can be drained from the plant support (14) before removing the plant support from the cup (12) and without having to invert or tilt the cup, thereby minimizing the risk of spillage. This is beneficial since some treatment agents may be hazardous and/or expensive. After the plant support (14) is removed from the cup (12), the secondary body portion (24) of the plant support can be swung open relative to the primary body portion (22) to thereby allow the plant(s) to be radially removed from the internal cavity of the plant support. Thereafter, the plant support can be reused. It should be appreciated that allowing plants to be inserted into and removed from the internal cavity (50) of the plant support (14) radially rather than axially reduces the likelihood of damage being caused to the plants.

Figures 10, 11:
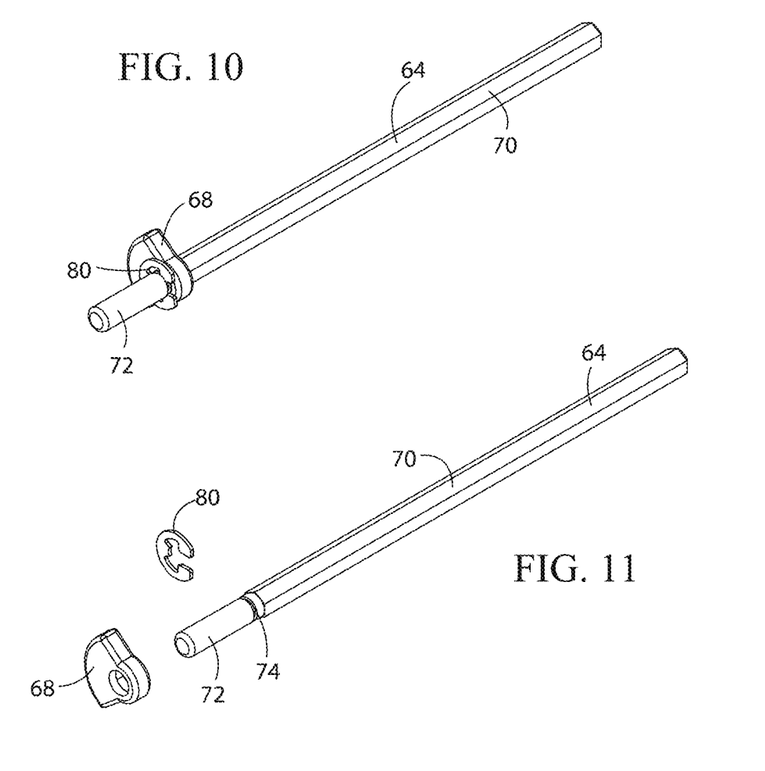
FIG. 10 depicts a perspective view of an assembly of a plant support rod and seed support protrusion of the plant support shown in FIGS. 7 through 9.
FIG. 11 depicts an exploded assembly view of the assembly shown in FIG. 10.
Figure 12:
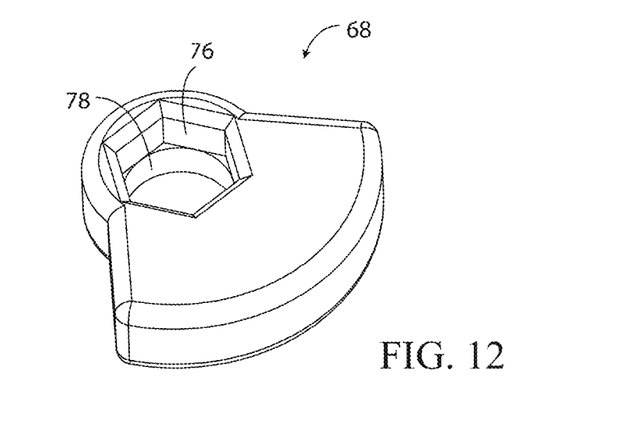
FIG. 12 depicts a perspective view of the seed support protrusion of the assembly shown in FIGS. 10 and 11.

Another embodiment of a plant support (60) is shown in FIGS. 6-9 and 14. This plant support (60) comprises a platform (62) that is configured to support a plurality of removable plant support rods (64) in a set orientation relative to the platform. Preferably the platform (62) is disk shaped and has sockets that protrude up from a base wall (65) and that are configured to support the plant support rods parallel to each other and perpendicular to the base wall. The plant support (60) further comprises a centrally positioned lifting rod (66) and a plurality of seed support protrusions (68). The lifting rod (66) is fixed to the platform (62) and is configured to extend above the tops of the plant support rods (64) to thereby serve as a convenient handle for lifting or lowering the platform together with the support rods. The seed support protrusions (68) are each connected to a respective one of the plant support rods (64) in a manner such that the seed support protrusions remain fixed to the plant support rods when the plant support rods are removed from the platform (62). More specifically and as shown in FIGS. 10 through 12, each support rod (64) has an upper portion (70) having a polygonal cross-section and a lower portion (72) that is necked down and cylindrical. Furthermore, an annular groove (74) extends into the lower portion (72) of the rod (64) close to, but spaced from, the upper portion of the rod (70). The seed support protrusion (68) is preferably pie shaped and comprises an opening that has a polygonal portion (76) and a cylindrical portion (78). Thus, the seed support protrusion (68) is assembled to the rod (64) by sliding the seed support protrusion upward onto the rod with the polygonal portion (76) of the opening of the seed support protrusion facing the upper portion (70) of the rod. The cylindrical portion (78) of the opening of the seed support protrusion (68) prevents the seed support protrusion from sliding further up the rod (64) once the cylindrical portion of the opening contacts the polygonal upper portion (70) of the rod and positions the seed support protrusion where an E-clip (80) can then be snapped into the groove (74) of the rod (64) directly beneath the seed support protrusion. The E-clip (80) thereby locks the seed support protrusion (68) to the rod (64) and the interlocking of the polygonal portion (76) of the opening of the seed support protrusion with the polygonal upper portion (70) of the rod prevents the seed support protrusion from rotating about the rod. When the rods 64 and their seed support protrusions (68) are placed in the sockets that protrude up from a base wall (65) of the platform (62), the seed support protrusions (68) are spaced above the base wall of the platform.

In use, the plant support (60) shown in FIGS. 6-9 and 14 is loaded with one or more plants (82) prior to being place into the cup 12. One or more plants (82) can be attached to any given one of the plant support rods (64) by a strap or tie (83). This is preferably done with the support rod (64) detached from the platform (62) of the plant support (60). The polygonal cross-section of the upper portion (70) of the plant support rod (64) makes it easier to prevent the plant from twisting around the support rod when being attached thereto than would otherwise be the case with a cylindrical support rod. If a plant comprises a seed (84), the plant can be positioned on the support rod (64) such that the seed rests on the top surface of the seed support protrusion (68) that is attached to the rod. Doing so lowers the chances that the seed (84) will become detached from the remainder of the plant (82) during centrifuging. The space between the seed support protrusions (68) and the base wall (65) of the platform (62) allows the seeds to rest on the seed support protrusions without interference from roots. With the desired number of plants (82) attached to the support rod (64), the bottom of the support rod can be slipped into an available socket of the platform (62). If desired, each support rod (64) of the plant support (60) may be loaded with one or more plants. Regardless, preferably all of the support rods (64) of the plant support (60) are attached to the platform (62) before centrifuging, whether or not they have plants attached to them. Doing that minimizes the degree to which the center of mass of the plant support (60) will be offset from the primary axis of the plant support. With the plant support (60) loaded with the desired number of plants, the plant support can be slid down into the cup (12) by holding the top of the lifting rod (66) of the plant support. A treatment agent can be inserted in the cup (12) before or after the plant support (60) is placed into the cup. As an option, the lifting rod (66) could take the form of a hollow tube and serve as a fluid drainage/fill tube in a manner similar to the drainage/fill tube of the plant support (14) shown in FIGS. 1-5.

Like with the first described embodiment of a plant support (14) the second embodiment of a plant support plant support (60) tilts during the centrifuging. Thus, like with the first embodiment, since the plants 47 are radially supported by the plant support (60), the plants also maintains a relatively constant orientation relative to g-loads experienced, as does the liquid treatment agent relative to the plants.

In view of the foregoing, it should be appreciated that the invention has several advantages over the prior art.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

It should also be understood that when introducing elements of the present invention in the claims or in the above description of exemplary embodiments of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations. Still further, the order in which the steps of any method claim that follows are presented should not be construed in a manner limiting the order in which such steps must be performed, unless such an order is inherent or explicit.

What is claimed is:

1. A method of infusing plant tissue with a liquid treatment agent, the method comprising:
   centrifuging a plant in a receptacle of a swing-bucket centrifuge, the plant being secured within the receptacle of the swing-bucket centrifuge such that the plant is held in a particular orientation relative to g-loading acting on the plant as a result of the centrifuging, the receptacle comprising an amount of the liquid treatment agent that is sufficient to submerge a portion of the plant therein while leaving a remaining portion of the plant unsubmerged during the centrifuging.

2. A method in accordance with claim 1 wherein the plant is secured to a rod within the receptacle that maintains an orientation parallel to the g-loading during the centrifuging.

3. A method in accordance with claim 2 further comprising removing the rod with the plant secured thereto from the receptacle following the centrifuging.

4. A method in accordance with claim 1 wherein the plant is held within an internal cavity of a plant support apparatus that is positioned within the receptacle during the centrifuging, and further comprising removing the plant support apparatus with the plant therein from the receptacle following the centrifuging.

5. A method in accordance with claim 4 wherein the plant support apparatus comprises at least first and second portions that are configurable in a closed configuration and an open configuration relative to each other, the plant support apparatus being secured in the closed configuration during the centrifuging, and further comprising:
   adjusting the at least first and second portions of the plant support apparatus from the closed configuration to the open configuration after removing the plant support apparatus from the receptacle following the centrifuging; and thereafter
   removing the plant from the plant support apparatus while the at least first and second portions of the plant support apparatus are in the open configuration.

6. A method in accordance with claim 5 wherein the at least first and second portions of the plant support apparatus are hingedly attached to each other and the adjusting of the at least first and second portions of the plant support apparatus from the closed configuration to the open configuration comprises hingedly swinging the at least first and second portions of the plant support apparatus relative to each other.

* * * * *